United States Patent
Mondinelli et al.

(10) Patent No.: US 7,466,701 B2
(45) Date of Patent: Dec. 16, 2008

(54) ROUTING PROCEDURE AND SYSTEM, CORRESPONDING NETWORK, SUCH AS A NETWORK ON CHIP (NOC), AND COMPUTER PROGRAM PRODUCT THEREFOR

(75) Inventors: Filippo Mondinelli, Brescia (IT); Michele Borgatti, Finale Emilia (IT); Zsolt Kovacs, Concesio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 742 days.

(21) Appl. No.: 10/987,941

(22) Filed: Nov. 12, 2004

(65) Prior Publication Data

US 2006/0104267 A1 May 18, 2006

(51) Int. Cl.
*H04L 12/28* (2006.01)

(52) U.S. Cl. .................. 370/389; 370/392; 370/235; 370/256

(58) Field of Classification Search .......... None
See application file for complete search history.

(56) References Cited

U.S. PATENT DOCUMENTS

2004/0221087 A1 * 11/2004 Benedetto et al. ........... 710/316

\* cited by examiner

*Primary Examiner*—Duc C Ho
(74) *Attorney, Agent, or Firm*—Lisa K. Jorgenson; Robert Iannucci; Seed IP Law Group PLLC

(57) ABSTRACT

A network, such as a network on chip, includes a plurality of levels of switches organized in a hierarchy. The connections between the switches are constituted by connections which are able to transport packets of information in opposite directions in such a way that one switch, or one process associated thereto, can send or receive packets in the framework of the network along one and the same path, constituted by an ascending stretch, in which the packet goes up the network hierarchy as far as a root switch common to the source and to the destination, and a descending stretch in which the packet goes down the network hierarchy towards the destination. A routing logic is provided, configured for defining the routing path in a non-adaptive way, selecting the ascending stretch according to the source and the descending stretch according to the destination, irrespective of the traffic of the packets.

39 Claims, 7 Drawing Sheets

US 7,466,701 B2

ROUTING PROCEDURE AND SYSTEM, CORRESPONDING NETWORK, SUCH AS A NETWORK ON CHIP (NOC), AND COMPUTER PROGRAM PRODUCT THEREFOR

BACKGROUND OF THE INVENTION

1. Field of the Invention

The present invention relates to routing techniques.

The invention has been developed with particular attention paid to its possible application to systems on chip (SoCs) and, more specifically, relates to the so-called networks on chip (NoCs), above all in relation to the known NoC topology referred to as "Fat-Tree topology". NoCs replace traditional buses and, as compared to buses, afford characteristics of modularity and the possibility of reuse. In particular, NoCs comprise switches and hence active nodes, which are designed for connecting the macroblocks (such as, for example, microprocessors memories, or the like).

Reference to this preferred context of application of the invention must not, however, be interpreted as in any way limiting the scope of the present invention.

2. Description of the Related Art

The appearance of networks on chip results from the evolution of systems on chip. The latter, following Moore's law, have reached a complexity such as to require a substantial re-thinking of the on-chip connection infrastructures, which up to now was represented for the most part by bus architectures. A factor that has concurred to rendering the situation more critical, as well as to increasing the complexity of chips, is the marked miniaturization of transistors. The dimensions reached have rendered increasingly less advantageous the generation of signals on metal paths of considerable length, both as regards the integrity of the signals and as regards the excessive expenditure in terms of energy requirement. For this reason, the hypothesis of a direct connection between computational modules, as occurs in the case of the bus, appears in many cases non-productive and risky.

The reasons that have pushed in the direction of a solution of the network-on-chip type and that have favored development thereof can basically be reduced to two major categories of factors:

the performance required by new digital systems; and the impact that the evolution of digital systems has had on the productivity of the firms operating in the sector.

More in general, the history of networks on chip has its roots in networks of processors. These have in fact been taken as main reference for the development of networks on chip thanks to the strong analogy existing between the two realities.

The main contributions coming from the study of networks of processors (see, for example, Russ Miller, Quentin F. Stout: *Algorithmic Techniques for Networks of Processors, CRC Handbook of Algorithms and Theory of Computation*, 1998, pp. 46:1-46:19) relate prevalently to algorithms for optimization of performance in routing of packets and to the study of topologies using graph theory.

In the first case, there has been inherited the majority of the taxonomy regarding protocols (Worm-Hole protocol and Store-and-Forward protocol) and the algorithms for routing packets (see, for example, Christian Scheideler, *Universal Routing Strategies for Interconnection Networks*, LNCS1390, Springer 1998), whilst, in the second case, studies conducted on particular hierarchical topologies called Fat-Tree topologies have been of considerable help (see, for example, C. Leiserson, *Fat-Tree: Universal Networks for Hardware-Efficient Supercomputing, IEEE Transactions on Computers*, vol. C-34, No. 10, pp. 892-901, October 1985), the topologies having the capacity of guaranteeing high levels of throughput with a limited number of switches and connections.

Other significant results regard the study of topologies and algorithms which prevent the formation of deadlocks in the network (see, for example, William J. Dally, Charles L. Seitz, *Deadlock-Free Routing in Multiprocessor Interconnection Networks*, 1985); from this latter study, it emerges that acyclical topologies, such as the Fat-Tree type, are less subject to deadlock situations.

The topology of a Fat-Tree type appears to be amongst the most favored for an implementation on silicon, in so far as it enables excellent levels of performance to be achieved with a contained number of switches (see, for example, Fabrizio Petrini, Marco Zanneschi: "k-ary n-trees: High Performance Networks for Massively Parallel Architectures", 11*th International Parallel Processing Symposium*, Vol. 1, Geneva, Switzerland 1997).

As may be noted in FIG. 1, a network of this type is formed by n levels of switches SW. The computational modules or processes P are connected to the lowest level of the network and constitute the leaves of the tree. The highest level is constituted by switches, each having k connections with k switches of the underlying level. The switches of the other levels have k connections with both of the adjacent levels. Each connection between the switches is constituted by two one-directional connections L1, L2 that transport the packets in opposite directions in such a way that one switch SW or one process P can send or receive packets along one and the same connection. Each connection is constituted by one part dedicated to data transportation, with parallelism p, and one part corresponding to the control signals. The maximum number of processes that can be connected to the network is $N=k^n$, and the processes are constituted by any module IP that is able to generate and/or acquire packets (DSPs, processors, memories, external network interface modules, DACs, etc.), whilst the number of switches is $S=n*k^{n-1}$. Set between the processes and the switches are interfaces IF, which have the task of adapting the protocol used by the processes to that of the network in such a way that the packets sent by a source process can be correctly routed as far as the destination process P.

In order for the routing procedure to be effective, it is preferable that both the switches SW and the interfaces IF (and hence the respective processes P) should have a unique identification number (ID) containing the information on the position in which they are located.

FIG. 2 represents an example of assignment method described in: Fabrizio Petrini, Marco Vanneschi, "k-ary n-trees: High Performance Networks for Massively Parallel Architectures", cited previously.

Basically, each processor is defined by an n-tuple of numbers ranging from 0 to (k−1), whilst each switch is defined by an orderly pair <w,l>, where w is formed by n−1 numbers ranging from 0 to k−1, and l is a number ranging from 0 to n−1.

Two switches <w0, w1, ..., $w_{n\_2}$, i> and <$w_{0'}$, $w_{1'}$, ..., $w_{n\_2'}$, l'> are connected if and only if l'=l+1 and $w_i=w_{i'}$ for every i≠l.

The switch <w0, w1, ..., $w_{n\_2}$, n−1> and the processor $p_0$, $p_1$, ..., $p_{n\_1}$ are connected if and only if $w_i=p_i$ for every i belonging to the set {0,1, ...,n−2}.

The modality of routing of the packets can vary according to the protocol and the algorithms used. There basically exist two types of routing protocols for networks on chip, from which there derive others, namely, the Store-and-Forward protocol and the Worm-Hole protocol (see, for example: Christian Scheideler, *Universal Routing Strategies for Interconnection Networks*, LNCS1390, Springer 1998; P. Guerrier, A. Greiner, *A Generic Architecture for On Chip Packet-Switched Interconnections*, DATE2000; and E. Rijpkema, K. G. W. Goossens, A. Radulescu, J. Dielissen, J. van Meerbergen, P. Wielage, E. Waterlander, *Trade Offs in the Design of a Router with Both Guaranteed and Best-Effort Services for Networks on Chip*, DATE2003).

In both cases, the packets must be stored entirely within the switches before being transmitted onto the next connection. In the Store-and-Forward case, each packet is routed irrespective of the others since the necessary information is contained in the header of each packet. In the Worm-Hole case, the packets are grouped into messages, and only the first packet of each message contains the header with the information for routing. In this case, a switch, after having transmitted the first packet of a message along a connection, reserves that connection for all the other packets of the same message in such a way that they can follow the same path as the first one, without interposition of any packet extraneous to the current message. After the last packet has been transmitted, the switch de-allocates the connection so as to render it available for another message.

When two or more packets contained at input to a switch are contending one and the same output connection, they are said to collide. The task of the routing algorithms, in particular of the routing scheme, is that of choosing, for each packet, the path that will reduce the possibility of collisions to the minimum, maximizing the routing speed.

The routing schemes can be divided into non-adaptive ones and adaptive ones (for a more complete treatment see, for example, Christian Scheideler, *Universal Routing Strategies for Interconnection Networks*, LNCS1390, Springer 1998, cited previously). In the first case, the path of a packet is decided only on the basis of the source and destination (A. Radulescu, K. G. W. Goossens, *Communication Services for Networks on Chip, SAMOS*, vol. II, pp. 275-299). In this way, all the packets coming from one and the same source arrive at destination in order, having followed the same path, thus rendering unnecessary for the interfaces the task of re-ordering the packets (see once again A. Radulescu, K. G. W. Goossens, *Communication Services for Networks on Chip, SAMOS*, vol. II, pp. 275-299). In the second case, the path will be adaptable to the different traffic conditions of the network (see once again: Fabrizio Petrini, Marco Vanneschi, *k-ary n-trees: High Performance Networks for Massively Parallel Architectures*), enabling optimization of the distribution of the packets.

Given that the number of connections between two levels of network hierarchy corresponds to the maximum number of processes N, the probability of collisions between packets is high even in conditions of moderate traffic. For this reason, it is appropriate for each packet to occupy, along its path, the smallest possible number of connections, i.e., to choose the minimum path between the source and the destination so as to minimize the likelihood of collision. Since the Fat-Tree is a hierarchical topology, the minimum path will be represented by an ascending stretch, which will bring the packet up the hierarchy as far as the "root switch" (common to the source and to the destination), and a descending stretch towards the destination. Given that there can exist more than one root switch common to a source and to a destination, there may exist a number of paths that will lead a packet from the source to one of these switches. Once it has arrived at the root switch, there, however, exists only one path which links the packet to the destination.

FIGS. 3 and 4 show the behavior of an adaptive routing scheme and of a non-adaptive routing scheme, respectively. In both figures, the references SW, IF and P designate, as in the preceding figures, the switches, the interfaces, and the processes, respectively (with the distinction, in the case of the latter between source S and destination D). The arrows facing upwards indicate ascending paths and the arrows facing downwards indicate descending paths.

The switch represents the active component of the network. As illustrated in FIG. 5, it is constituted by:

2*k input ports 10, which accept the packets and store them in dedicated buffers 10*a*;

2*k output ports 20, which function as temporary-memory locations (buffers 20*a*) for the packets in the transmission step;

control logics for the input ports and output ports, the input logic being designated by 30 and the output logic by 40; these handle acquisition, routing, and transmission of the packets;

a first crossbar 60 for the data, which connects each input port to all the output ports; and a second crossbar 70 for the control lines, which connects the input control logic with the output one.

The control lines of each connection are constituted by a write line and a ready line (in the case of the Store-and-Forward protocol). The write line is driven by the port of the switch that transmits the packet (output port) and is read by the port of the switch that receives the packet (input port), whilst for the ready line the opposite applies.

Prior to acquisition of a packet, the output port that wants to transmit a packet checks whether the ready line is active; if it is, it activates the write line and, in the next clock cycles, transmits the packet on the data lines. When the input port starts to receive the packet, it disables the ready signal, which will remain disabled until the packet is transmitted to another switch. At the end of the transmission of the packet, the output port disables the write signal. When the packet is received by an input port, it is stored in the corresponding buffer. The buffer of each input port behaves as a queue (FIFO). If each packet is assumed as having a size of h bits (multiple of p), then each buffer will be characterized by a parallelism p equal to the parallelism of the data lines and a depth d=h/p, which will indicate also the time (in terms of clock cycles) used for storing a packet and the time for re-transmitting it.

As represented schematically in FIG. 6, which regards the mechanism of internal scheduling, during the step of acquisition (FIG. 6*a*) the control logic 30 corresponding to the input port in question reads the header of the packet and, on the basis of the routing scheme implemented, signals to a given output port the intention to transmit the packet via a request signal.

The request signal is transmitted through the crossbar 70 of the control signals. At this point, the control logic 40 corresponding to the output port decides, on the basis of a scheduling algorithm, whether or not to grant permission to transmit the packet.

If it does (FIG. 6*b*), the logic 40 issues a grant signal (once again through the crossbar of the control signals 70) to the control logic of the input port in question. At this point, if the switch or the interface downstream is available for reception, the packet is transmitted through the output port selected, passing through the data crossbar. Further details on the mechanism may be inferred from: E. Rijpkema, K. G. W. Goossens, A. Radulescu, J. Dielissen, J. van Meerbergen, P.

Wielage, E. Waterlander, *Trade Offs in the Design of a Router with Both Guaranteed and Best-Effort Services for Networks on Chip*, DATE2003 and E. Rijpkema, K. G. W. Goossens, P. Wielage, *A Router Architecture for Networks on Silicon*, PROCEEDINGS OF PROGRESS 2001.

Summing up what has been said previously, unlike bus architectures, the network on chip (NoC) is based upon the transmission of packets, as in the case of networks of processors. It is constituted by switches, which have the task of routing the packets, and by physical connections between switches, which represent the medium through which the packets are routed. Given that only some connections are involved in routing of a packet, in the case of the network on chip there is a considerable saving in terms of energy per bit transmitted if compared to the case of the bus. In fact, in this latter case, all the transmissions occur via broadcast even though the source and destination of the data flow are close to each other.

The use of brief connections in the network on chip makes it moreover possible to preserve better the integrity of the signals, since they are less subject to disturbance.

A further advantage lies in the fact that it is possible to think of the resource "network on chip" as being formed by a variable number of resources (the physical connections between switches), which can be allocated in an independent way. This enables parallel handling of different routing requests, unlike the bus solution, in which the bus itself constitutes an allocable resource only as a whole and hence is available only for transmissions of data in series. Given that the number of connections available in a network on chip, and hence its capacity for parallelizing transmissions, can vary according to the design requirements, the network on chip is defined as "scalable", unlike the bus network, which is "non-scalable".

The characteristic of high level of parallelism enables a considerable increase in the throughput and a reduction in the time that a source must wait before being able to transmit the data to the destination.

An aspect of increasing importance in the design and construction of systems on chip (SoCs) is the increasing gap between the possibilities, in terms of performance and complexity, provided by the new technologies and their manageability. The increasing number of ports that can be housed on a single chip poses in fact the problem of handling, with times compatible with those of the market, designs of exponentially increasing complexity. Given that the problem cannot be faced by increasing exponentially the dimension of the project teams, it is preferable to break up the complexity of the problem into a hierarchy of sub-problems. To do this, it is preferable that each sub-problem can be handled independently of the others. The result is that of generating for each sub-problem a module (IP) in turn constituted by other modules.

The reuse of the existing modules hence becomes an important characteristic of this approach. The advantages linked to this choice are:
  contained times for design, since the design of the SoC is articulated on different levels, and at each level the designer must at the most assemble the modules present at a lower hierarchical level;
  higher reliability, in so far as each module is tested separately and hence in a more exhaustive manner and with less effort;
  greater predictability, on account of the fact that the modular structure of the SoC reduces the degrees of freedom of the system, which hence results in being a combination of a limited number of well-known functions; and
  greater reusability since the modules created can be reused in other SoC contexts, so reducing drastically the design times and costs.

The disadvantage of a set-up of the above sort is the loss in terms optimality of the result, given that intervention at each level of the design cannot extend to intervention on the actual modules employed. The network on chip fits perfectly within such a context. In fact, it tends to replace the bus, which is a fruit of a design methodology that meets requirements different from current ones, creating in its stead an IP block. This is reasonable if it is considered that currently the problems generated by interconnections are in many cases comparable to, if indeed they do not prevail over, the ones linked to computational modules. For this reason, it can be of considerable help to create libraries of IP modules that concern also the infrastructures of communication of the SoC. These NoC libraries may be set alongside the traditional ones, so contributing to guaranteeing high levels of performance and shorter production times with more contained costs.

BRIEF SUMMARY OF THE INVENTION

One embodiment of the present invention provides an improved solution, which, on the one hand, makes it possible to fully benefit from the advantages outlined previously, whilst, on the other, eliminates the disadvantages referred to previously.

One embodiment of the present invention is directed to a procedure having the characteristics recalled in the ensuing claims, which form an integral part of the descriptive content of the present application. The present invention also relates to a corresponding system, to a network such as a network on chip (NoC) based upon said system, as well as to a computer product, loadable into the memory of at least one computer and comprising software code portions for implementing the process of the invention when the product is run on at least one computer. As used herein, reference to said computer product is to be understood as being equivalent to reference to a medium, which can be read by a computer and contains instructions for controlling a computer system for the purpose of coordinating execution of the procedure according to the invention.

The procedure according to one embodiment of the invention enables routing of information packets in a network comprising a plurality of levels of switches organized in a hierarchy, in which the highest level comprises switches, each having a set of connections with respective switches of the underlying level, and the lowest level comprises switches which are able to interact with respective processes, the connections between the switches being constituted by connections that are able to transport said packets in opposite directions in such a way that one switch, or one process associated thereto, can send or receive packets in the framework of the network along one and the same path constituted by an ascending stretch, in which the packet goes up the network hierarchy as far as a root switch common to the source and to the destination, and a descending stretch, in which the packet goes down the network hierarchy towards the destination. A preferred embodiment of a system according to the invention comprises a routing logic configured for defining the routing path in a non-adaptive way, selecting the ascending stretch according (only) to the source and the descending stretch according (only) to the destination, irrespective of the traffic of the packets.

In a preferred way, said system comprises, implemented within the switches:

an input logic configured for reading the header of a packet to be routed and signaling at output from the switch itself, via a request signal, the intention to transmit the packet; and an output logic configured for receiving said request signal and deciding whether or not to grant permission to transmit the packet, and if so emitting a respective transmission-grant signal, assigning said grant signal on the basis of a criterion chosen between:

i) attributing to a request a priority inversely proportional to the distance that separates the packet from said destination, said distance being identified by the number of connections that the packet must still traverse from the switch in which it is found to reach the destination; and ii) randomly selecting one of the requests received.

In its preferred embodiment, the invention is based upon the observation of the fact that, in a network of the type described (NoC), the connection between one process and another occurs through the array of switches: once the starting and arrival points of the signal have been defined, a number of "up-hill" paths are possible, whilst, for this NoC topology, only one down-hill path is virtually possible; hence, it is the down-hill path that represents the bottleneck of the process.

The solution described herein is "smart" and faces the specific problem linked to the fact that, given a starting point and a point of arrival, a number of paths are possible, and consequently the signals can arrive with different times at the point of arrival, and hence the sequence of signals coming from one and the same source may not be maintained at the point of arrival (e.g., the letters of one and the same word can arrive mixed). It is hence preferable to proceed to a re-ordering of the sequence. The solution described herein envisages resorting to a non-adaptive criterion, which, in the ascending stretch, depends only upon the source and, in the descending stretch, upon the destination (and not upon the traffic).

In this way, two paths are never superimposed, and hence the network is faster. To be more precise, the routing algorithm defines the routing uniquely, once the source/destination (S/D) pair has been defined. Consequently, given one and the same S/D pair, the ascending and descending stretches selected are always the same. The packets are not superimposed, but collisions in the ascending stretch are excluded by the very structure of the system. In the descending stretch, given that two packets with different sources can have the same destination, it is not possible to prevent collisions.

Furthermore, the sequence of arrival is always guaranteed once the source and the destination are fixed (e.g., the letters of one and the same word arrive with the right order at the destination even if the words of two sources may be superimposed on one another).

The solution described herein is suited to being implemented within each macroblock and adapts according to the network, i.e., it is parametric.

The invention is applicable in a preferred way to Fat-Tree topologies. The NoC envisages control logics, an input one and an output one. The signals pass according to request and assignment. It is possible to define requests with priority (it is possible to choose the type of priority) for a certain signal for the problems in the down-hill stage. Whilst in the known art, recourse is made to a generator of random numbers, the solution described herein enables implementation of the control logic by simply including a counter. The solution described herein functions on the other hand also with control logics including a random generator. More specifically, the use of a counter, instead of a generator of random numbers, is possible thanks to the randomness of the traffic in the network and hence at input to the switches. Given the randomness of the traffic generated at input to the network, the implementation of the scheduling algorithm via a counter is possible with any routing algorithm used. In fact, the purpose of the routing algorithm is to find the best path for a packet, but said algorithm cannot decide the moment and type of packets that are introduced into the network.

BRIEF DESCRIPTION OF THE DRAWINGS

The invention will now be described, purely by way of non-limiting example, with reference to the figures of the annexed plate of drawings, in which.

DETAILED DESCRIPTION OF THE INVENTION

Figure 1:
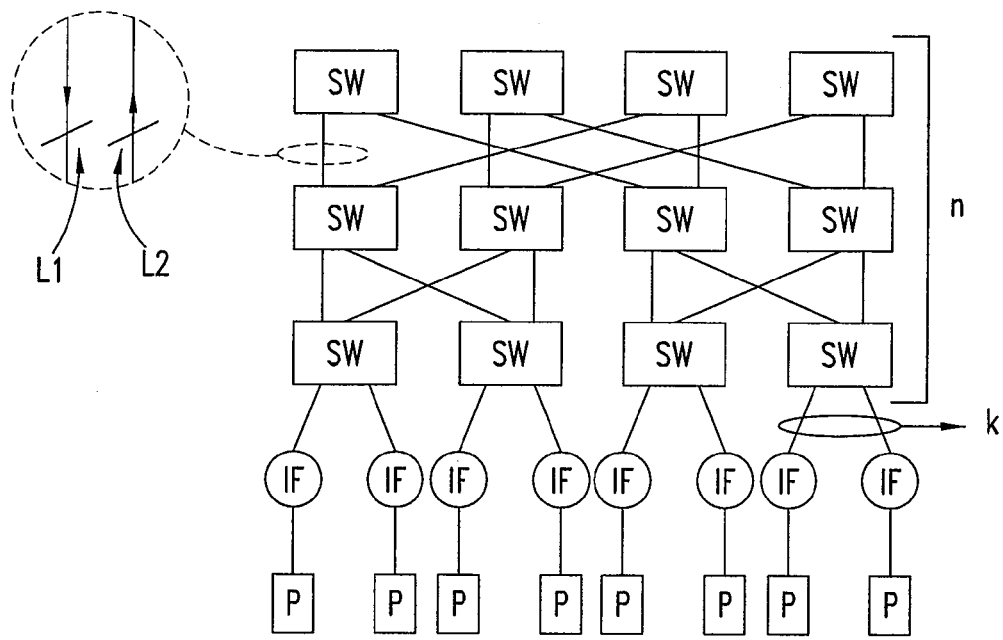
FIGS. 1 to 6 have already been described previously.
Figure 2:
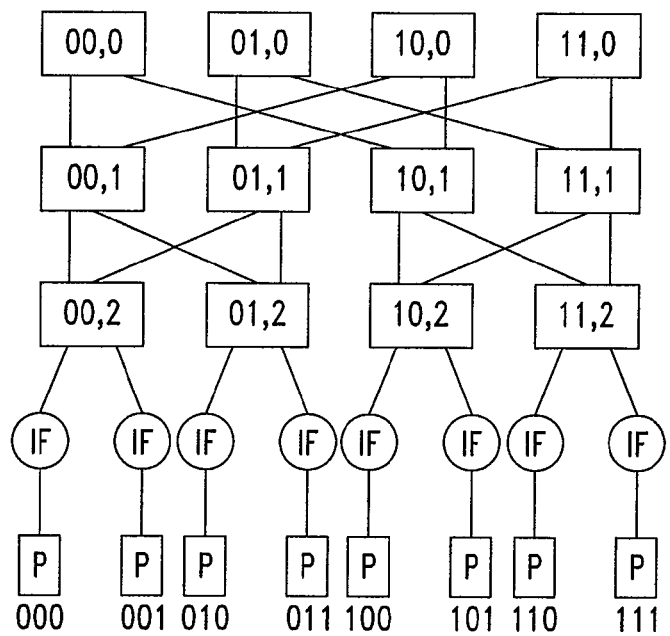
Figure 3:
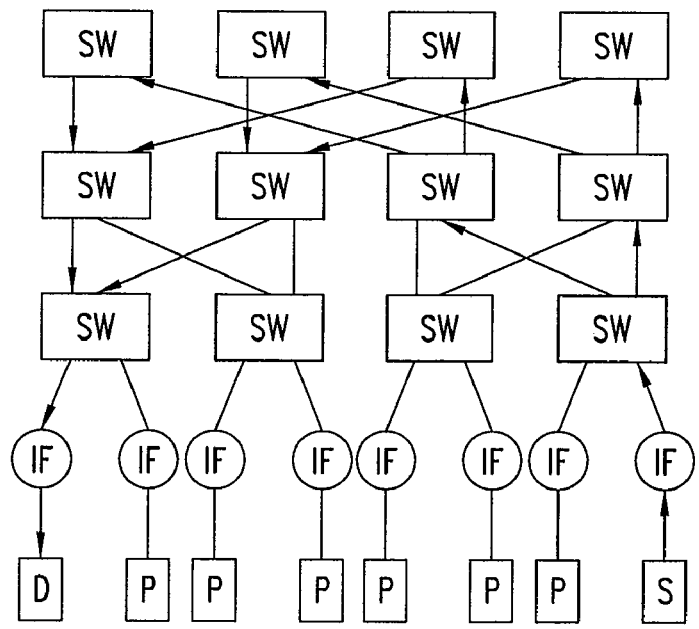
Figure 4:
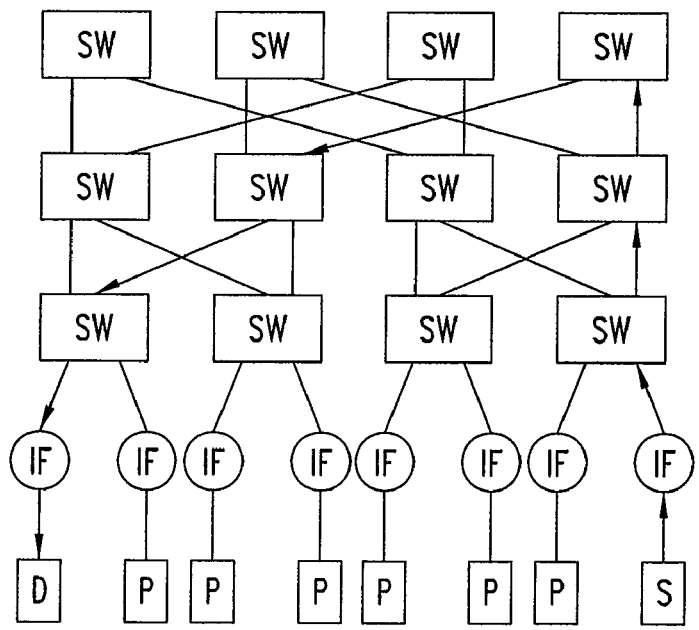
Figure 5:
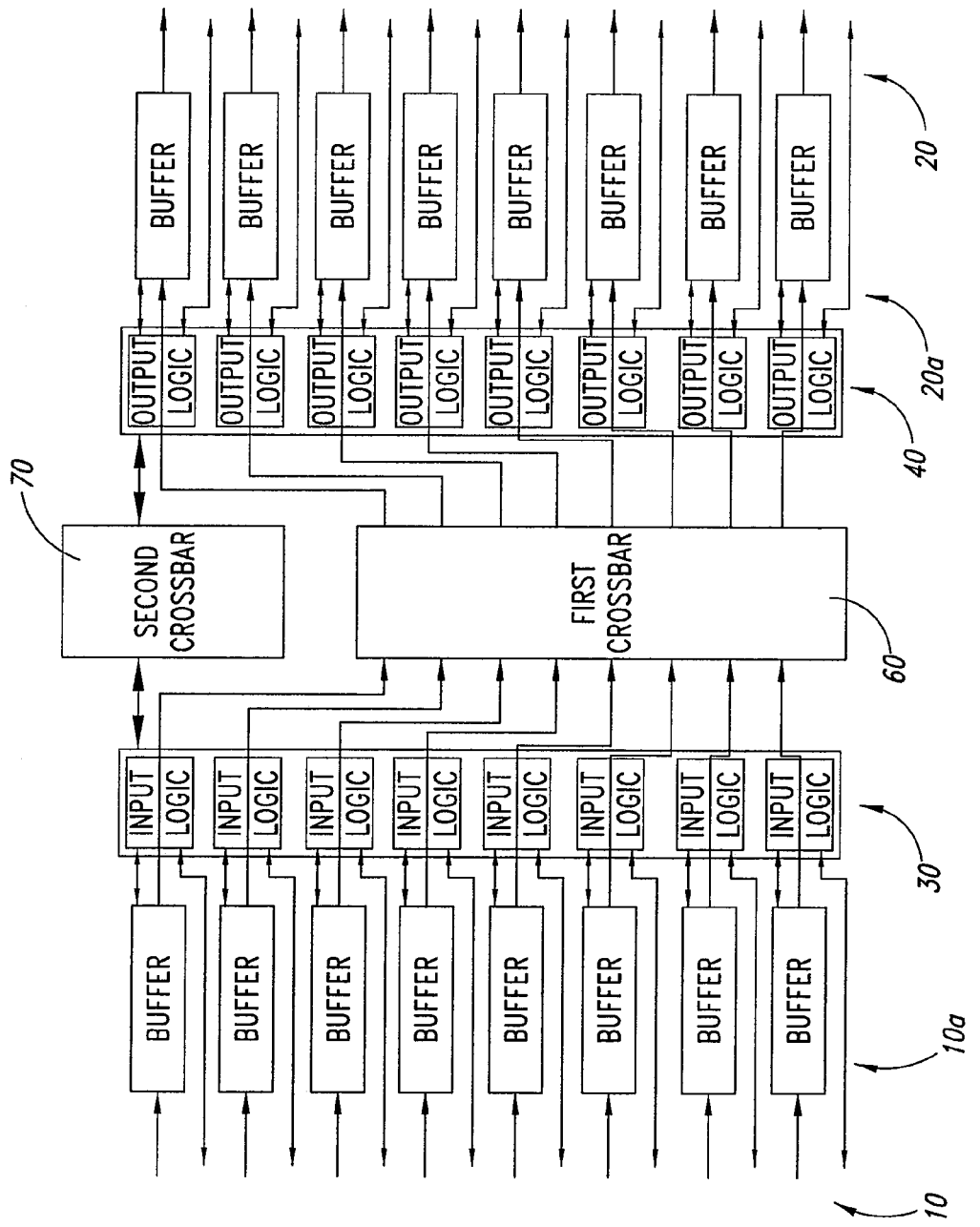

In the network on chip (NoC) described herein (represented in FIG. 7 using the same formalism and the same references already used in FIGS. 1 to 4), the level of performance is optimized first of all considering a routing scheme which is designed for guaranteeing optimal performance.

As has been said previously, the adaptive scheme has the possibility of adapting the path of the packet only in the ascending stretch, whilst for the non-adaptive scheme the entire path is defined by the source and by the destination of the packet. This implies that the two schemes have in common the modalities with which the descending stretch of the minimum path is chosen. In the case of the adaptive scheme, the fact that the path can be adapted only in the first half does not provide any guarantee on the optimality of the descending stretch defined as a result.

In fact, it is a routing algorithm of an on-line type, in which each switch has no knowledge of the traffic in the remaining part of the network, and hence the decisions taken by a switch SW in the ascending stretch of the path do not take into account the situation of traffic present in the descending stretch. The descending stretch of the minimum path hence constitutes a bottleneck for the performance of the system (in fact, each step of optimization performed in the ascending stretch is rendered vain by the rigidity of the descending stretch) and, given that this is in common to the two schemes, the levels of performance in the two cases may be considered almost equivalent from this standpoint. Since the non-adaptive scheme is based exclusively upon a spatial correspondence, it is simpler than the adaptive scheme, which must implement also an algorithm for detection and allocation of free connections. This means a smaller area occupied and a lower energy required for the routing calculations. For this reason, the choice has been made of implementing on a topology of a Fat-Tree type a non-adaptive routing scheme, unlike what is encountered in the state of the art.

A first scheme that describes the operations performed by this type of routing is provided in what follows.

Routing Algorithm 1

Consider having to route a packet containing, in the header, the source and destination identifiers ID.

Assume that:

the source ID is x and is constituted by n numbers ranging from 0 to (k−1): $<x_1, x_2, \ldots, x_n>$;

the destination ID is y and is constituted by n numbers ranging from 0 to (k−1): $<y_1, y_2, \ldots, y_n>$;

the ID of the generic switch, having the task of routing the packet, is constituted by an orderly pair $<w,l>$, where w is made up of n−1 numbers ranging from 0 to k−1 and l is a number ranging from 0 to n−1 (representing the level that the switch occupies in the network): $<w_1, w_2, \ldots, w_{n-1}, l>$;

the ports that connect the switch to the top level of the network are called parent ports and are numbered from 0 to (k−1), following the same direction of numbering as that used for the switches;

the ports that connect the switch to the bottom level of the network are called son ports and are numbered from 0 to (k−1), following the same direction of numbering as that used for the switches;

if l=0, then the switch is at the highest level of the network and hence the packet must be routed towards a son port (descending stretch);

if l≠0, then the first l numbers of w are compared with the first l numbers of y; if they coincide, then the packet must be routed towards a son port (descending stretch); otherwise, it must be routed towards a parent port (ascending stretch);

if the ascending stretch has been chosen, the packet is routed towards the parent port number $x_{l+1}$; and if the descending stretch has been chosen, the packet is routed towards the son port number $y_{l+1}$.

The routing procedure just described enables identification, in the ascending stretch, of a unique path defined by the source of the packet and, in the descending stretch, of a unique path defined by the destination. This means that packets coming from different processes will certainly have different paths in the ascending stretch. This guarantees the absence of collisions in the ascending stretch.

Figure 7:
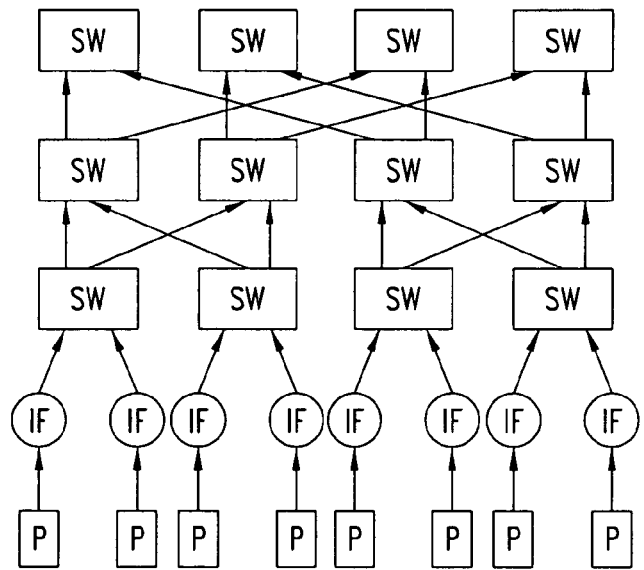
FIG. 7 represents various ascending paths in the framework of a network of the type described herein.

FIG. 7 shows the various paths in the ascending stretch for packets coming from different sources in a Fat-Tree network, with n=3 and k=2.

The solution described herein has the further task of optimizing the scheduling algorithm within the switches SW.

Figure 6:
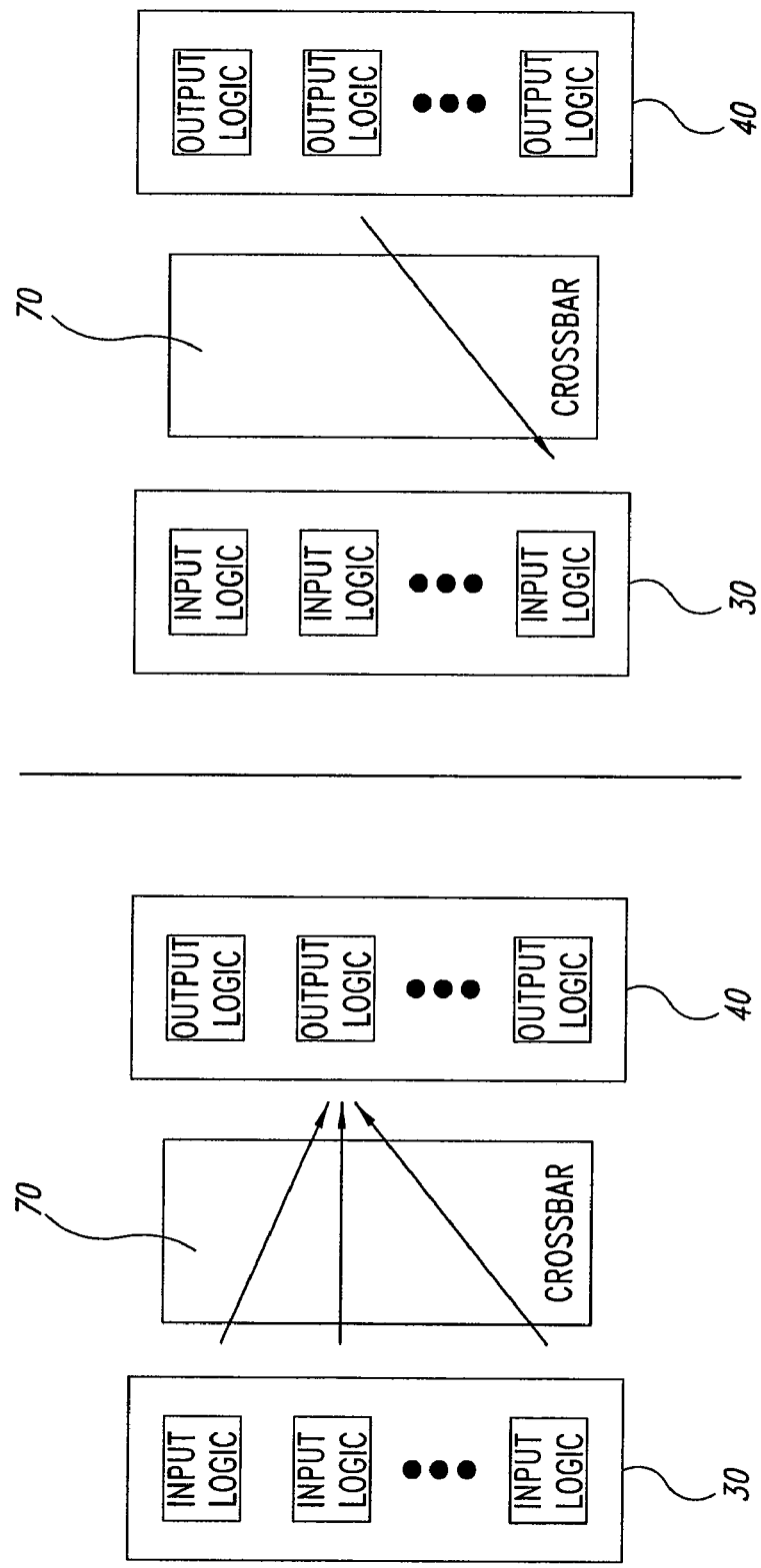

There exist different criteria for the assignment of the grant signal (see FIG. 6). These can be grouped into two categories, namely, criteria that establish a priority between the requests made and criteria that do not establish any priority.

In the former category, it is particularly advantageous to implement a criterion such that the priority of a request is inversely proportional to the distance that separates the respective packet from the destination. By "distance" is meant the number of connections that a packet must still traverse starting from the switch in which it is located in order to arrive at the destination.

Using this criterion, an increase in the speed of the packets along their path (given that this leads them increasingly closer to the destination) is achieved, and hence the absence of deadlocks is guaranteed.

The distance is calculated as follows:

assume that the hypotheses formulated at the level of routing in the Routing Algorithm 1 are valid;

let c be an integer which represents the first c numbers that are the same as one another in the vectors $<w_1, w_2, \ldots, w_l>$ and $<y_1, y_2, \ldots, y_l>$, and is zero in the case where l=0;

the distance e is calculated according to the equation:

$$\text{distance} = (n-c+1)*2 - (n-l) = n - 2*c + 3*l.$$

This criterion is used by the control logic 30 of the input port during the acquisition of the packet. Subsequently, together with the request signal, it must transmit to the respective output control logic 40 also the result of the calculation in such a way that the latter can establish a priority between the requests that have reached it. This entails, in the present case, a certain increase in the connections present in the crossbar 70 of the control signals. Subsequently, the output control logic 40 identifies the request with highest priority and issues the grant signal.

In the case, instead, of scheduling without priority, the input control logic 30 has the task of transmitting only the request signal to the appropriate output, thus achieving a simplification both in the calculation part and in the crossbar of the control signals. At this point, the output control logic 40 selects in a random way one of the requests received. Given that this selection does not envisage processing of the information on the priority, it is characterized by a combinatorial logic that is simpler and hence will dissipate less power and will occupy a smaller area.

In order to establish which of the two criteria of scheduling is preferable, it is possible to carry out direct comparisons, considering, notwithstanding the sensible difference in complexity of calculation, that both of the criteria require a time corresponding to two clock cycles from transmission of the request signal to transmission of the grant signal.

A reference network that can be used for the comparison is characterized by n=3, k=4, p=32, and h=128 (hence it contains 64 processes P and 48 switches SW). The protocol used is of the Store-and-Forward type.

The packets are created in groups of J packets, which is to say that after having created the first packet, as soon as the connection with the switches is available for transmission, the process creates another packet and so forth up to the J-th packet. The groups of packets are, instead, created with a probability P':

$$P' = \frac{P}{(1-P)J + P}$$

where P is the probability of generating a single packet.

This formula ensures that the same number of packets is generated in a certain time interval irrespective of the parameter J.

In the graphs of FIGS. 8 to 11, on the abscissa there appears the probability of transmission P, and all the results are normalized to said parameter.

The two algorithms for scheduling of the packets are compared, with J=8 and J=32, varying TP from 0.02 to 0.8, with observation on $5*10^5$ clock cycles.

Figure 8:
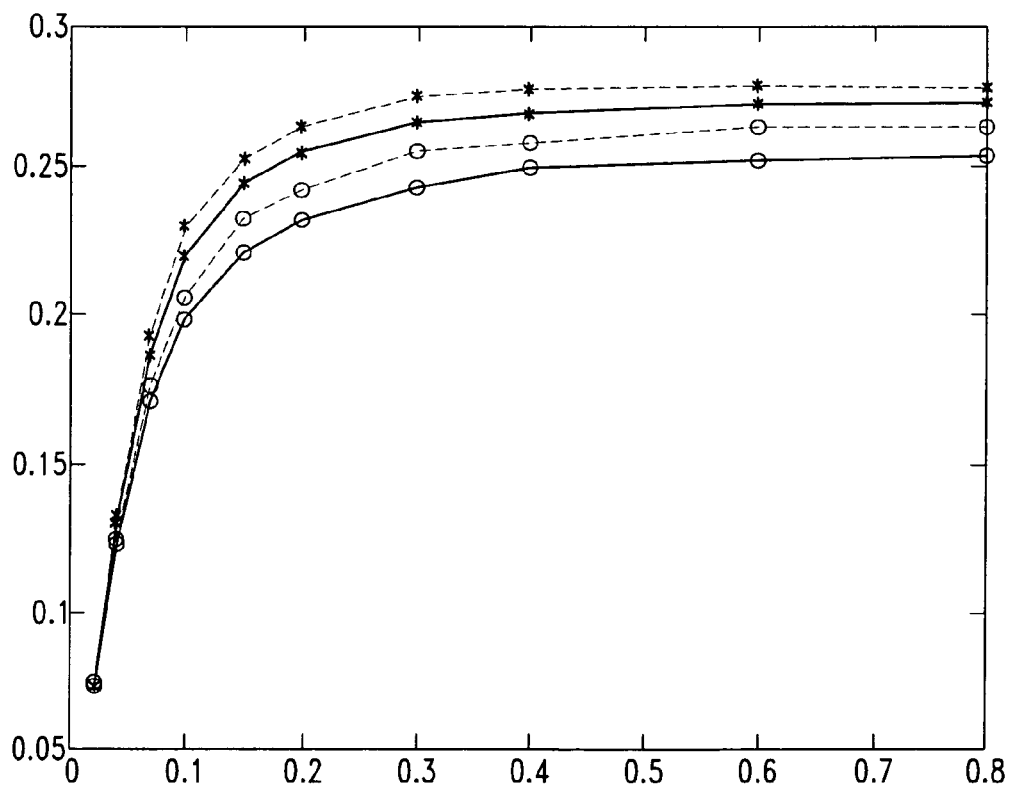
FIG. 8 represents a diagram of relative throughput detected on a network of the type described herein.

The diagrams of FIG. 8 refer to the relative throughput (expressed as a fraction of the total bandwidth), obtained by dividing the total number of bits arrived at destination per clock cycle by the bandwidth of the system (64*32=2048 bits/clock cycle).

Figure 9:
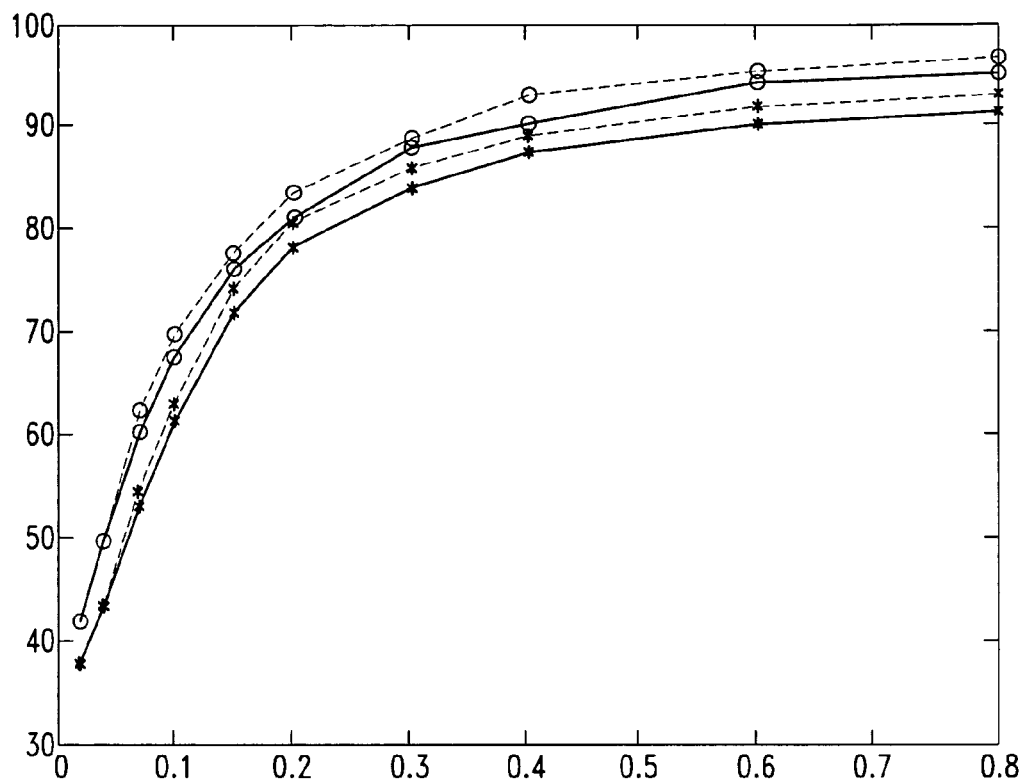
FIG. 9 represents a corresponding diagram of mean latency.

The diagrams of FIG. 9 refer, instead, to the mean latency (expressed in clock cycles), i.e., the time that is necessary on average for a packet to traverse the network from the moment in which it has been introduced thereon.

Both in FIG. 8 and in FIG. 9:

the curve indicated by asterisks (*) and a solid line refers to a random scheduling, with messages of 8 packets;

the curve indicated by circles (o) and a solid line refers once again to a random scheduling, with messages of 32 packets;

the curve indicated by asterisks (*) and a dotted line refers to a priority scheduling, with messages of 8 packets; and the curve indicated by circles (o) and a dotted line refers to a priority scheduling, with messages of 32 packets.

The results show that the performance of the network in terms of throughput in the two cases is almost the same (FIG. 8). The reason for this is that priority scheduling routes the short-trip packets rapidly whilst the long-trip packets are more neglected and hence are slower. For this reason, the network will tend to be filled with a larger number of packets with respect to the case of scheduling without priority. A larger number of packets in the network means a larger number of packets for each switch, which can hence exploit better the parallelism of the output control logic. Scheduling without priority treats each packet exactly in the same manner so that each packet traverses the network, on average, with the same speed and does not saturate the network as in the previous case.

The mean latency (FIG. 9), corresponding to scheduling with priority, is greater since a larger number of packets in the network also implies a larger number of collisions. As J increases, there is noted a degradation in the performance because there is an increase in the correlation between the paths of the packets (instead of being 8 following the same path, they are 32). This means that the dispersion of the packets is reduced (smaller throughput), and hence there is an increase in the number of collisions.

Given that the performance of the two types of scheduling are equivalent in different conditions of operation, the choice for the implementation on silicon falls on the one that guarantees lowest costs in terms of area occupation and power dissipation. According to this criterion, the best candidate is scheduling without priority.

At this stage, it is useful to dwell briefly on the modalities of transfer of information from the input control logic 30 to the output control logic 40.

The convention used in this case for numbering the ports envisages that the ports of a son type are numbered from 1 to k and the parent ports from k+1 to 2*k (hence the parent port 2 corresponds to the port k+2). The vector of signals that has the function of signaling requests of transmission is the vector R.

This has a size of $(2*k)^2$ bits, in so far as it must operate in such a way that all the input ports (2*k) can make requests for transmission to all the output ports (2*k). In actual fact, the output port corresponding to the input port that wants to transmit a packet will never be selected, but in order to render the addressing algorithm less complex, the vector has been considered as a whole. The vector R is written by the control logic of the input ports and is read by the control logic of the output ports, and each position in the vector corresponds to an input/output pair. The first 2k bits are written by the input port 1, the next 2k bits are written by the port 2, and so on.

Within the 2k bits, the first one is addressed to the output port 1, the second one to the output port 2 up to the bit 2k. Consequently, if the bit $R((i-1)*2*k+j)$ is set at 1 with $i-1 \neq j$, this means that the i-th input port has requested transmission of a packet through the j-th output port. To inform the input ports that they can transmit, the output ports use the vector G. This behaves in the opposite manner with respect to R, is written by the control logic of the output ports, and is read by control logic of the input ports, the j-th output port has associated thereto the j-th group of 2*k bits, and each of these is assigned, in order, to a different input port. Hence, if the bit $G(j-1)*2*k+i)$ is set at 1 with $j-1 \neq i$, this means that the j-th output port has consented to transmission of a packet coming from the i-th input port.

For each output control logic, the scheduling procedure considered consists in monitoring the bits of the vector R that regard it and, following upon arrival of a request, communicating authorization to the corresponding port by enabling the corresponding bit in the vector G. In the case of simultaneous arrival of a number of requests, the output logic chooses between them in a random way. If it is assumed that the output port considered is the j-th, then this must monitor all the bits occupying the position j modulus k of the vector R. After choosing which port to send the grant signal to, it must enable one of the j-th 2*k bits of the vector G. The system that executes scheduling without priority, prior to selecting an input port in a random way, ascertains that said port has made a request for data transfer with the appropriate bit in the vector R. Furthermore, the grant signal can be sent just to one input port at a time.

The random selection takes place with the use of a counter synchronous with the system clock. This is a module-2*k counter, 2*k being the total number of ports of each switch SW. At each clock cycle the number indicated by the counter corresponds to the input port enabled for transmission of its own packet at output. For each switch SW there exists just one counter; hence, all the output ports 20 refer to the same counter in order to make the decision. When an output port j receives at least one transfer request, said port checks the output value of the counter, which is assumed as being $1 \leq i \leq 2*k$. It then verifies whether $R((j-i)*2*k+j)=1$. If the relation is verified, then it sets $G((i-1)2*k+i)=1$; otherwise, it proceeds to considering, in increasing order, all the other input ports until it encounters a transmission request.

Described in what follows is the operation of the algorithm using a pseudo-code:

```
const1 := 0;
const2 := 0;
end := 0;
for c in 1 to (2*k) loop
    if (i+c > 2*k), then
        const1 := 4*k*k;
        const2 := 2*k;
    end if;
    if (R((i-1+c) *2*k+j-const1) = '1' and end = 0), then
        G(i+c-const2) := '1';
        end := 1;
    else
        G(i+c-const2) := '0';
    end if;
end loop;
```

Using a counter instead of a generator of random numbers is much simpler and means a lower energy requirement for each routing, a smaller area occupation, and a shorter critical path. In fact, the scheduling algorithm indicated is executed in a single clock cycle; this would not be possible using a more complex algorithm. In the latter case, a very long critical path would have imposed the need for spreading execution thereof over a number of clock cycles, degrading the performance of the switches and hence of the network. From the standpoint of behavior, the choice made does not entail any penalization: in fact, as regards routing of the packets in the network, a generator of random numbers from 1 to 2k is exactly equivalent to a counter from 1 to 2k.

This is because:

the order of the arrival of the packets, the time of arrival, and the moment in which the packets can be routed are purely random values and hence automatically uncorrelated with any generator of numbers, whether random or otherwise. This guarantees that the choice made by the output ports will always have the characteristic of a random choice.

This type of scheduling was tested again on a network on chip created using the VHDL language. The new parameters of the network were n=3, k=4, p=16, h=128, and the routing protocol was of the Store-and-Forward type. The tests were conducted for different values of probability P of creation/transmission of the packets, with P equal to 0.0078125, 0.015625, 0.03125, 0.0625, 0.125, 0.25, 0.5, 1.

Figure 10:
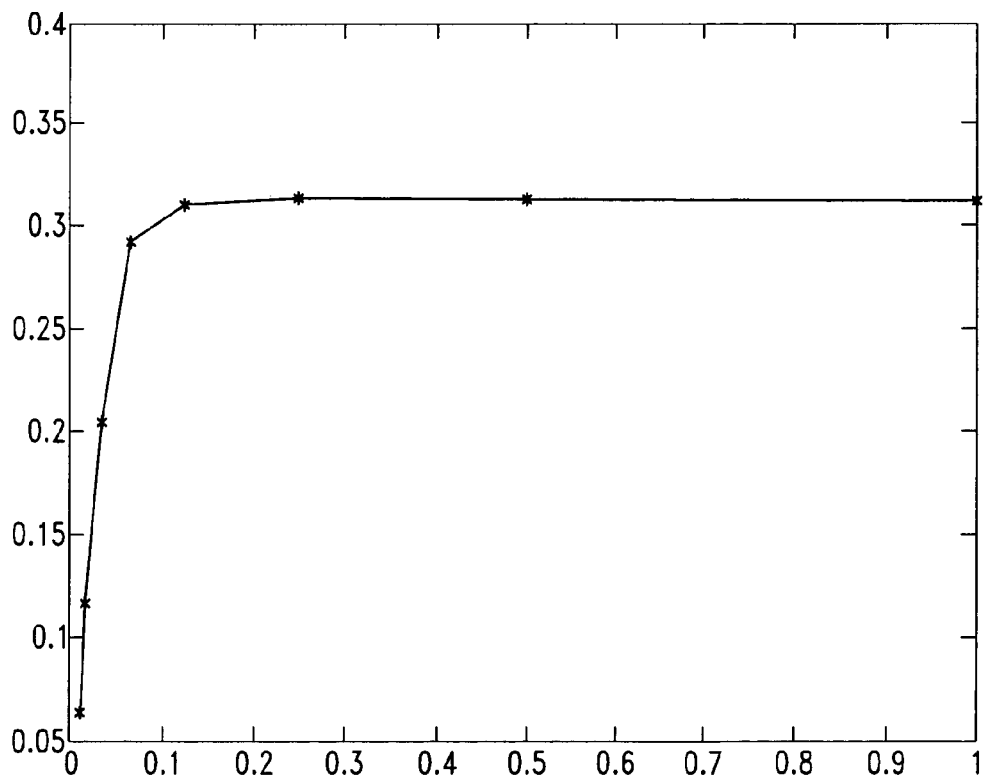
FIG. 10 represents a further throughput diagram.
Figure 11:
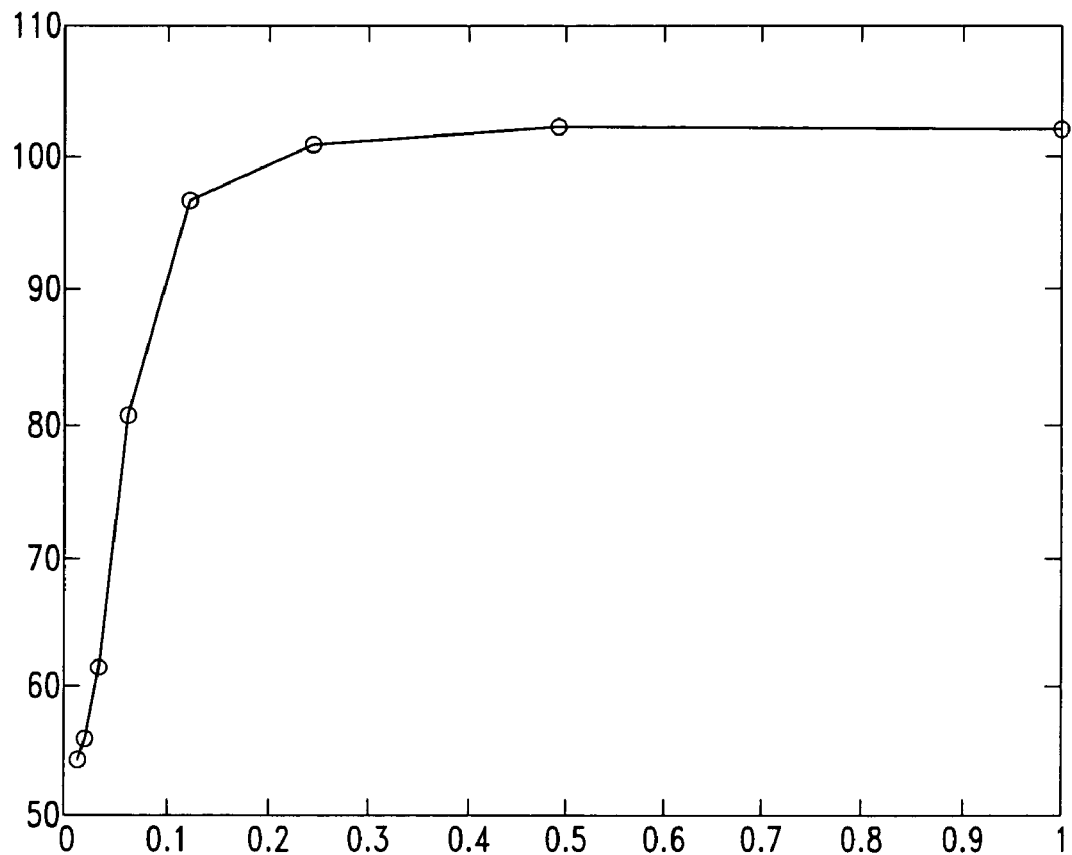
FIG. 11 represents a further diagram of mean latency.

FIG. 10 shows the relative throughput, whilst FIG. 11 shows the mean latency.

It will be appreciated that the solution described herein proposes a non-adaptive routing scheme (for example, for networks of the Fat-Tree type) such as to optimize the performance of the network using, at the same time, a simple embodiment suited for on-chip solutions. By way of reference, the fact may be mentioned that the performance of a traditional bus in the same conditions is a relative throughput of 0.015625 and a mean latency longer than 500 clock cycles.

There is also proposed a criterion of random scheduling implemented within the switches SW of the network. The results show the absence of degradation in performance due to the loss of priority between the packets to be routed. Said criterion enables a simpler implementation on silicon, with a reduced encumbrance and a lower power dissipation.

The architecture described is hence ideally suited to applications integrated on a single chip.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

It will also be appreciated that, without prejudice the principle of the invention, the details of construction and the embodiments may vary, even extensively, with respect to what is described and illustrated herein purely by way of non-limiting example, without thereby departing from the scope of the invention, as defined in the ensuing claims.

The invention claimed is:

1. A method, comprising:
routing a packets of information in a network having a plurality of levels of switches organized in a hierarchy, in which a highest level includes switches, each having a set of connections with respective switches of an underlying level, and a lowest level includes switches which are able to interact with respective processes, said switches being connected by connections which are able to transport packets in opposite directions in such a way that one of the switches, or one of the processes associated with the one switch and acting as a source, can send the packets in the network along a path constituted by an ascending stretch, in which the packet goes up the network hierarchy as far as a root switch common to the source and a destination, and a descending stretch, in which the packet goes down the network hierarchy towards the destination, the routing including:
defining said path in a non-adaptive way; and
selecting said ascending stretch according to the source without regard for the destination and selecting said descending stretch according to the destination, without regard for the source, irrespective of traffic of packets being transmitted in the network.

2. The method according to claim 1, further comprising providing, within said network, further switches comprised in hierarchical levels different from said highest level and from said lowest level, said further switches having connections with adjacent levels in the network hierarchy.

3. The method according to claim 1, further comprising providing, in said connections, a part dedicated to data transportation and a part corresponding to control signals.

4. The method according to claim 1, further comprising providing interfaces which are able to interact with said processes and said switches for adapting a protocol used by the processes to a protocol of the network in such a way that packets sent by a source process can be correctly routed as far as a destination process.

5. The method according to claim 4, further comprising associating with said interfaces a unique identifier containing information on a position which said interfaces occupy.

6. The method according to claim 1, comprising associating with each of said switches a unique identifier containing information on a position which each of said switches occupies.

7. The method according to claim 1, further comprising,
reading, at an input of one of the switches, a header of a packet to be routed, and signaling at an output of the switch itself an intention to transmit the packet via a request signal;
receiving said request signal at output from the switch, and deciding whether to grant permission to transmit the packet, and if so issuing a respective transmission-grant signal; and
assigning said grant signal based on a criterion chosen between:
 i) attributing to the request a priority inversely proportional to a distance that separates the packet from said destination, said distance being identified by the number of connections that the packet must still traverse from said one switch in which it is located in order to arrive at said destination; and
 ii) randomly selecting one of plural requests received.

8. A method of routing packets of information in a network having a plurality of levels of switches organized in a hierarchy, in which a highest level includes switches, each having a set of connections with respective switches of an underlying level, and a lowest level includes switches which are able to interact with respective processes, said switches being connected by connections which are able to transport packets in opposite directions in such a way that one of the switches, or one of the processes associated with the one switch and acting as a source, can send or receive packets in the network along one and a same path constituted by an ascending stretch, in which the packet goes up the network hierarchy as far as a root switch common to the source and a destination, and a descending stretch, in which the packet goes down the network hierarchy towards the destination, the method comprising:
defining said path in a non-adaptive way;
selecting said ascending stretch according to the source and said descending stretch according to the destination, irrespective of traffic of packets being transmitted in the network;
associating with said switches a unique identifier containing information on a position in which said switches are located; and
defining said path by steps including:
letting x be an identifier of said source, constituted by n numbers ranging from 0 to (k−1): $<x_1,x_2,\ldots,x_n>$, wherein k is the number of switches;
letting y be an identifier of said destination, constituted by n numbers ranging from 0 to (k−1): $<y_1,y_2,\ldots,y_n>$;

letting the identifier of the switch comprised in said path be constituted by an orderly pair <w,l>, where w is made up of n−1 numbers ranging from 0 to k−1 and l is a number ranging from 0 to n−1, representing a level that said switch occupies in said network: <$w_1, w_2, \ldots, w_{n-1}, l$>;

providing ports, referred to as parent ports and numbered from 0 to (k−1), following a same direction of numbering used for the switches that connect said switch to the highest level of the network;

providing ports, referred to as son ports and numbered from 0 to (k−1), following the same direction of numbering used for the switches that connect said switch to the lowest level of the network;

if l=0, then the switch is at the highest level of the network and hence the packet is routed into the descending stretch towards a son port;

if l≠0, then the first l numbers of w are compared with the first l numbers of y; if they coincide, then the packet is routed into the descending stretch towards a son port; otherwise, it is routed into the ascending stretch towards a parent port;

if the ascending stretch has been chosen, the packet is routed towards the parent port number $x_{l+1}$; and if the descending stretch has been chosen, the packet is routed towards the son port number $y_{l+1}$.

9. The method according to claim 8, further comprising:

reading, at an input of one of the switches, a header of a packet to be routed, and signaling at an output of the switch itself an intention to transmit the packet via a request signal;

receiving said request signal at output from the switch, and deciding whether to grant permission to transmit the packet, and if so issuing a respective transmission-grant signal; and assigning said grant signal based on a criterion chosen between:

i) attributing to the request a priority inversely proportional to a distance that separates the packet from said destination, said distance being identified by the number of connections that the packet must still traverse from said one switch in which it is located in order to arrive at said destination; and ii) randomly selecting one of plural requests received, wherein, with c designating an integer which represents the first c numbers that are the same in the vectors <$w_1, w_2, \ldots, w_l$> and <$y_1, y_2, \ldots, y_l$> and is zero in the case where l=0, said distance is calculated as:

$$\text{distance} = (n-c+1)*2 - (n-l) = n - 2*c + 3*l.$$

10. A method of routing packets of information in a network having a plurality of levels of switches organized in a hierarchy, in which a highest level includes switches, each having a set of connections with respective switches of an underlying level, and a lowest level includes switches which are able to interact with respective processes, said switches being connected by connections which are able to transport packets in opposite directions in such a way that one of the switches, or one of the processes associated with the one switch and acting as a source, can send or receive packets in the network along one and a same path constituted by an ascending stretch, in which the packet goes up the network hierarchy as far as a root switch common to the source and a destination, and a descending stretch, in which the packet goes down the network hierarchy towards the destination, the method comprising:

defining said path in a non-adaptive way;

selecting said ascending stretch according to the source and said descending stretch according to the destination, irrespective of traffic of packets being transmitted in the network;

reading, at an input of one of the switches, a header of a packet to be routed, and signaling at an output of the switch itself an intention to transmit the packet via a request signal;

receiving said request signal at output from the switch, and deciding whether to grant permission to transmit the packet, and if so issuing a respective transmission-grant signal; and assigning said grant signal based on a criterion chosen between:

i) attributing to the request a priority inversely proportional to a distance that separates the packet from said destination, said distance being identified by the number of connections that the packet must still traverse from said one switch in which it is located in order to arrive at said destination; and ii) randomly selecting one of plural requests received.

11. The method according to claim 10, wherein said random selection entails the use of a counter synchronous with a network clock, said clock being a module-2*k counter, where k is the total number of ports of the respective switches, at each clock cycle the number indicated by the counter designating the input port enabled to transmit its own packet at output.

12. The method according to claim 11, further comprising providing for each switch only one said synchronous counter, so that all the output ports of the switch refer to said counter for deciding whether to grant permission to transmit the packet.

13. The method according to claim 10, further comprising:

organizing said request signal as a first vector, in which each position in said first vector corresponds to an input port/output port pair of said one switch; said first vector being written by a logic associated with the input ports and read by a logic associated with the output ports of the switch;

organizing said grant signal in the form of a second vector written by said logic associated with the output ports and read by said logic associated with the input ports of the switch; and monitoring, via said output logic, the positions of said first vector and, upon arrival of the request signal, communicating said grant signal to the corresponding port, enabling the corresponding position in said second vector.

14. The method according to claim 13, wherein, in the case of arrival of a number of simultaneous request signals, said output logic chooses from among said request signals in a random way.

15. The method according to claim 13, wherein said grant signal is sent to one input port at a time.

16. A system for routing packets of information in a network comprising:

a plurality of levels of switches organized in a hierarchy in which a highest level includes switches, each having a set of connections with respective switches of an underlying level, and a lowest level of switches;

a plurality of processes connected respectively to said switches by connections that are able to transport packets in opposite directions in such a way that one switch, or one process associated with the one switch and acting as a source, can send or receive packets in the network along one and the same path constituted by an ascending stretch, in which a packet goes up the network hierarchy as far as a root switch in common to the source and to a destination, and a descending stretch, in which the packet goes down the network hierarchy towards the destination; and a routing logic configured for defining said path in a non-adaptive way, by selecting said ascending stretch according to the source without regard for the destination and selecting said descending stretch according to the destination without regard for the source, irrespective of traffic of packets being transmitted in the network.

17. The system according to claim 16, wherein the plurality of switches includes further switches comprised in hierarchical levels different from said highest level and from said lowest level, said further switches having connections with adjacent levels in the network hierarchy.

18. The system according to claim 16 wherein said connections comprise one part dedicated to data transportation and one part corresponding to control signals.

19. The system according to claim 16, further comprising interfaces which interact with said processes and said switches for adapting a protocol used by the processes to a protocol of the network in such a way that the packets sent by a source process can be correctly routed as far as the destination process.

20. The system according to claim 19, wherein each of said interfaces has associated thereto a unique identifier containing information on a position which each interface occupies.

21. The system according to claim 16, wherein each of said switches has associated thereto a unique identifier containing information on a position which said switch occupies.

22. The system according to claim 16, wherein said switches comprise:
- an input logic configured for reading the header of a packet to be routed and signaling at output from the switch itself the intention to transmit the packet via a request signal;
- an output logic configured for receiving said request signal and deciding whether or not to grant the permission to transmit the packet, and if so, issuing a respective transmission-grant signal and assigning said grant signal on the basis of a criterion chosen between:
  i) attributing to a request a priority inversely proportional to the distance that separates the packet from said destination, said distance being identified by the number of connections that the packet must still traverse from said one switch in which it is located to arrive at said destination; and
  ii) randomly selecting one of the requests received.

23. A system for routing packets of information in a network comprising:
- a plurality of levels of switches organized in a hierarchy in which a highest level includes switches, each having a set of connections with respective switches of an underlying level, and a lowest level of switches;
- a plurality of processes connected respectively to said switches by connections that are able to transport packets in opposite directions in such a way that one switch, or one process associated with the one switch and acting as a source, can send or receive packets in the network along one and the same path constituted by an ascending stretch, in which a packet goes up the network hierarchy as far as a root switch in common to the source and to a destination, and a descending stretch, in which the packet goes down the network hierarchy towards the destination; and a routing logic configured for defining said path in a non-adaptive way, selecting said ascending stretch according to the source and said descending stretch according to the destination, irrespective of traffic of packets being transmitted in the network, wherein each of said switches has associated thereto a unique identifier containing information on a position which each switch occupies and said routing logic is configured for defining said path based on a procedure comprising the steps of:

letting x be an identifier of said source, constituted by n numbers ranging from 0 to (k−1): $<x_1,x_2,\ldots,x_n>$, wherein k is the number of switches;

letting y be an identifier of said destination, constituted by n numbers ranging from 0 to (k−1): $<y_1,y_2,\ldots,y_n>$;

letting the identifier of the generic switch comprised in said routing path be constituted by an orderly pair $<w,l>$, where w is made up of n−1 numbers ranging from 0 to k−1 and l is a number ranging from 0 to n−1, representing the level that said generic switch occupies in said network: $<w_1,w_2,\ldots,w_{n-1},l>$;

providing ports, referred to as parent ports and numbered from 0 to (k−1) following the same direction of numbering used for the switches that connect said generic switch to the highest level of the network;

providing ports, referred to as son ports and numbered from 0 to (k−1) following the same direction of numbering used for the switches that connect said generic switch to the lowest level of the network;

if l=0, then the switch is at the highest level of the network and hence the packet is routed into the descending stretch towards a son port;

if l≠0, then the first l numbers of w are compared with the first l numbers of y; if they coincide, then the packet is routed into the descending stretch towards a son port; otherwise, it is routed into the ascending stretch towards a parent port;

if the ascending stretch has been chosen, the packet is routed towards the parent port number $x_{l+1}$; and if the descending stretch has been chosen, the packet is routed towards the son port number $y_{l+1}$.

24. The system according to claim 23 wherein said switches comprise:
- an input logic configured for reading the header of a packet to be routed and signaling at output from the switch itself the intention to transmit the packet via a request signal;
- an output logic configured for receiving said request signal and deciding whether or not to grant the permission to transmit the packet, and if so, issuing a respective transmission-grant signal and assigning said grant signal on the basis of a criterion chosen between:
  i) attributing to a request a priority inversely proportional to the distance that separates the packet from said destination, said distance being identified by the number of connections that the packet must still traverse from said one switch in which it is located to arrive at said destination; and
  ii) randomly selecting one of the requests received, wherein the output logic is further configured to designate by c an integer that will represent the first c numbers that are the same as one another in the vectors $<w_1,w_2,\ldots,w_l>$ and $<y_1,y_2,\ldots,y_l>$ and is zero in the case where l=0, and said distance is calculated as:

$$\text{distance}=(n-c+1)*2-(n-l)=n-2*c+3*l.$$

25. A system for routing packets of information in a network comprising:
- a plurality of levels of switches organized in a hierarchy in which a highest level includes switches, each having a set of connections with respective switches of an underlying level, and a lowest level of switches;
- a plurality of processes connected respectively to said switches by connections that are able to transport packets in opposite directions in such a way that one switch, or one process associated with the one switch and acting as a source, can send or receive packets in the network along one and the same path constituted by an ascending stretch, in which a packet goes up the network hierarchy as far as a root switch in common to the source and to a destination, and a descending stretch, in which the packet goes down the network hierarchy towards the destination; and
- a routing logic configured for defining said path in a non-adaptive way, selecting said ascending stretch according to the source and said descending stretch according to the destination, irrespective of traffic of packets being transmitted in the network, wherein said switches comprise:
- an input logic configured for reading the header of a packet to be routed and signaling at output from the switch itself the intention to transmit the packet via a request signal;
- an output logic configured for receiving said request signal and deciding whether or not to grant the permission to transmit the packet, and if so, issuing a respective transmission-grant signal and assigning said grant signal on the basis of a criterion chosen between:
  - i) attributing to a request a priority inversely proportional to the distance that separates the packet from said destination, said distance being identified by the number of connections that the packet must still traverse from said one switch in which it is located to arrive at said destination; and
  - ii) randomly selecting one of the requests received.

26. The system according to claim 25, wherein said switches comprise a counter synchronous with the network clock, said clock being a module-2*k counter, where k is the total number of ports of the switches, the number indicated by the counter designating, at each clock cycle, the input port enabled to transmit at output its own packet.

27. The system according to claim 26, wherein each switch comprises only one said synchronous counter, so that all the output ports of the switch refer to said counter for deciding whether to grant permission to transmit the packet.

28. The system according to claim 25, wherein said request signal is organized in the form of a first vector having positions that correspond to input port/output port pairs of said one switch, respectively, and wherein said grant signal is in the form of a second vector, and said output logic is configured for monitoring the positions of said first vector and, upon arrival of the request signal, communicating said grant to the corresponding port and enabling a corresponding position in said second vector.

29. The system according to claim 28, wherein said output logic is configured for choosing in a random way from among a number of simultaneous requests.

30. The system according to claim 28, wherein said output logic is configured for sending said grant signal to one input port at a time.

31. A network comprising:
- a plurality of levels of switches organized in a hierarchy, in which a highest level comprises switches, each having a set of connections with respective switches of an underlying level, and a lowest level comprises switches;
- a plurality of processes respectively connected to said switches by connections which are able to transport packets of information in opposite directions in such a way that one switch, or one process associated with the one switch and acting as a source, can send or receive packets in the network along one and the same path constituted by an ascending stretch, in which a packet goes up the network hierarchy as far as a root switch common to the source and a destination, and a descending stretch, in which the packet goes down the network hierarchy towards the destination; and
- a routing logic configured for defining said path in a non-adaptive way, by selecting said ascending stretch according to the source without regard for the destination and selecting said descending stretch according to the destination without regard for the source, irrespective of traffic of packets being transmitted in the network.

32. The network according to claim 31, implemented as a network on chip.

33. The network according to claim 31, wherein each of said switches has associated thereto a unique identifier containing information on a position which each switch occupies and said routing logic is configured for defining said path based on a procedure comprising the steps of:
- letting x be an identifier of said source, constituted by n numbers ranging from 0 to (k−1): $<x_1,x_2, \ldots ,x_n>$, wherein K is the number of switches;
- letting y be an identifier of said destination, constituted by n numbers ranging from 0 to (k−1): $<y_1,y_2, \ldots ,y_n>$;
- letting the identifier of the generic switch comprised in said routing path be constituted by an orderly pair $<w,l>$, where w is made up of n−1 numbers ranging from 0 to k−1 and l is a number ranging from 0 to n−1, representing the level that said generic switch occupies in said network: $<w_1,w_2, \ldots ,w_{n-1},l>$;
- providing ports, referred to as parent ports and numbered from 0 to (k−1) following the same direction of numbering used for the switches that connect said generic switch to the highest level of the network;
- providing ports, referred to as son ports and numbered from 0 to (k−1) following the same direction of numbering used for the switches that connect said generic switch to the lowest level of the network;
- if l=0, then the switch is at the highest level of the network and hence the packet is routed into the descending stretch towards a son port;
- if l≠0, then the first l numbers of w are compared with the first l numbers of y; if they coincide, then the packet is routed into the descending stretch towards a son port; otherwise, it is routed into the ascending stretch towards a parent port;
- if the ascending stretch has been chosen, the packet is routed towards the parent port number $x_{l+1}$; and
- if the descending stretch has been chosen, the packet is routed towards the son port number $y_{l+1}$.

34. The network according to claim 31, wherein said switches comprise:
- an input logic configured for reading the header of a packet to be routed and signaling at output from the switch itself the intention to transmit the packet via a request signal;
- an output logic configured for receiving said request signal and deciding whether or not to grant the permission to transmit the packet, and if so, issuing a respective transmission-grant signal and assigning said grant signal on the basis of a criterion chosen between:
  i) attributing to a request a priority inversely proportional to the distance that separates the packet from said destination, said distance being identified by the number of connections that the packet must still traverse from said one switch in which it is located to arrive at said destination; and
  ii) randomly selecting one of the requests received.

35. The network according to claim 34, wherein said switches comprise a counter synchronous with the network clock, said clock being a module-2*k counter, where k is the total number of ports of the switches, the number indicated by the counter designating, at each clock cycle, the input port enabled to transmit at output its own packet.

36. A computer-readable medium encoded with instructions that cause a computing device to implement a method of routing packets of information in a network having a plurality of levels of switches organized in a hierarchy, in which a highest level includes switches, each having a set of connections with respective switches of an underlying level, and a lowest level includes switches which are able to interact with respective processes, said switches being connected by connections which are able to transport packets in opposite directions in such a way that one of the switches, or one of the processes associated with the one switch and acting as a source, can send or receive packets in the network along one and a same path constituted by an ascending stretch, in which the packet goes up the network hierarchy as far as a root switch common to the source and a destination, and a descending stretch, in which the packet goes down the network hierarchy towards the destination, the method comprising:
  defining said path in a non-adaptive way; and
  selecting said ascending stretch according to the source without regard for the destination and selecting said descending stretch according to the destination without regard for the source, irrespective of traffic of packets being transmitted in the network.

37. The computer-readable medium according to claim 36, wherein the method further comprises:
  associating with said switches a unique identifier containing information on a position in which said switches are located; and
  defining said path by steps including:
  letting x be an identifier of said source, constituted by n numbers ranging from 0 to (k−1): $<x_1,x_2,\ldots,x_n>$, wherein k is the number of switches;
  letting y be an identifier of said destination, constituted by n numbers ranging from 0 to (k−1): $<y_1,y_2,\ldots,y_n>$;
  letting the identifier of the switch comprised in said path be constituted by an orderly pair $<w,l>$, where w is made up of n−1 numbers ranging from 0 to k−1 and l is a number ranging from 0 to n−1, representing a level that said switch occupies in said network: $<w_1,w_2,\ldots,w_{n-1},l>$;
  providing ports, referred to as parent ports and numbered from 0 to (k−1), following a same direction of numbering used for the switches that connect said switch to the highest level of the network;
  providing ports, referred to as son ports and numbered from 0 to (k−1), following the same direction of numbering used for the switches that connect said switch to the lowest level of the network;
  if l=0, then the switch is at the highest level of the network and hence the packet is routed into the descending stretch towards a son port;
  if l≠0, then the first l numbers of w are compared with the first l numbers of y; if they coincide, then the packet is routed into the descending stretch towards a son port; otherwise, it is routed into the ascending stretch towards a parent port;
  if the ascending stretch has been chosen, the packet is routed towards the parent port number $x_{l+1}$; and
  if the descending stretch has been chosen, the packet is routed towards the son port number $y_{l+1}$.

38. The computer-readable medium according to claim 37, wherein the method further comprises:
  reading, at an input of one of the switches, a header of a packet to be routed, and signaling at an output of the switch itself an intention to transmit the packet via a request signal;
  receiving said request signal at output from the switch, and deciding whether to grant permission to transmit the packet, and if so issuing a respective transmission-grant signal; and
  assigning said grant signal based on a criterion chosen between:
    i) attributing to the request a priority inversely proportional to a distance that separates the packet from said destination, said distance being identified by the number of connections that the packet must still traverse from said one switch in which it is located in order to arrive at said destination; and
    ii) randomly selecting one of plural requests received, wherein, with c designating an integer which represents the first c numbers that are the same in the vectors $<w_1,w_2,\ldots,w_l>$ and $<y_1,y_2,\ldots,y_l>$ and is zero in the case where l=0, said distance is calculated as:

$$\text{distance}=(n-c+1)*2-(n-l)=n-2*c+3*l.$$

39. The computer-readable medium according to claim 36, wherein the method further comprises:
  reading, at an input of one of the switches, a header of a packet to be routed, and signaling at an output of the switch itself an intention to transmit the packet via a request signal;
  receiving said request signal at output from the switch, and deciding whether to grant permission to transmit the packet, and if so issuing a respective transmission-grant signal; and
  assigning said grant signal based on a criterion chosen between:
    i) attributing to the request a priority inversely proportional to a distance that separates the packet from said destination, said distance being identified by the number of connections that the packet must still traverse from said one switch in which it is located in order to arrive at said destination; and
    ii) randomly selecting one of plural requests received.

* * * * *

UNITED STATES PATENT AND TRADEMARK OFFICE
CERTIFICATE OF CORRECTION

PATENT NO. : 7,466,701 B2  Page 1 of 1
APPLICATION NO. : 10/987941
DATED : December 16, 2008
INVENTOR(S) : Filippo Mondinelli et al.

It is certified that error appears in the above-identified patent and that said Letters Patent is hereby corrected as shown below:

Column 13
Line 43, "routing a packets of information in a network having a" should read as
-- routing a packet of information in a network having a --

Column 15
Lines 2-3, "constituted by an orderly pair <w,I>, where w is made up of n-1 numbers ranging from 0 to k-1 and I is a number" should read as -- constituted by an orderly pair <w,l>, where w is made up of n-1 numbers ranging from 0 to k-1 and l is a number --

Signed and Sealed this

Second Day of June, 2009

JOHN DOLL
*Acting Director of the United States Patent and Trademark Office*